(12) United States Patent
Schwebke et al.

(10) Patent No.: US 10,135,823 B2
(45) Date of Patent: Nov. 20, 2018

(54) INPUT REDIRECTION WITH A CLOUD CLIENT DEVICE

(71) Applicant: Dell Products L.P., Round Rock, TX (US)

(72) Inventors: Curtis John Schwebke, Los Gatos, CA (US); Kiran Ranganatha Rao, San Jose, CA (US); Richard Graham Cook, San Jose, CA (US); Kenneth Craig Coley, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 517 days.

(21) Appl. No.: 14/058,017

(22) Filed: Oct. 18, 2013

(65) Prior Publication Data

US 2014/0195595 A1 Jul. 10, 2014

Related U.S. Application Data

(60) Provisional application No. 61/749,781, filed on Jan. 7, 2013.

(51) Int. Cl.
*H04L 29/06* (2006.01)
*H04W 12/06* (2009.01)
(Continued)

(52) U.S. Cl.
CPC .......... *H04L 63/0876* (2013.01); *H04L 63/08* (2013.01); *H04L 67/2833* (2013.01);
(Continued)

(58) Field of Classification Search
CPC ............................................. G06F 2203/0381
See application file for complete search history.

(56) References Cited

U.S. PATENT DOCUMENTS 6,377,928 B1 4/2002 Saxena
6,993,642 B2 1/2006 Burkhardt
(Continued)

FOREIGN PATENT DOCUMENTS

EP 2336886 6/2011
WO WO 2012/0126823 9/2012 ............. H04W 4/00

OTHER PUBLICATIONS

Dave Roos "How Wireless Mesh Networks Work" Jun. 20, 2007. HowStuffWorks.com. <http://computer.howstuffworks.com/how-wireless-mesh-networks-work.htm> Feb. 16, 2017.*
(Continued)

*Primary Examiner* — June Y Sison
(74) *Attorney, Agent, or Firm* — Baker Botts L.L.P.

(57) ABSTRACT

In one embodiment, a cloud client device identifies one or more devices within a pre-determined range of the cloud client device operable to communicate with the cloud client device. The cloud client device pairs with one or more of the devices. The cloud client device receives first input from a client device coupled to the cloud client device. The cloud client device translates the first input from a first format to a second format and sends the translated first input to one of the one or more devices. The cloud client device receives second input from one of the one or more devices, translates the second input from a third format to a fourth format, and provides the translated second input to the client device.

20 Claims, 5 Drawing Sheets

(51) Int. Cl.
*H04L 29/08* (2006.01)
*H04W 8/00* (2009.01)

(52) U.S. Cl.
CPC ............ *H04L 67/42* (2013.01); *H04W 8/005* (2013.01); *H04W 12/06* (2013.01)

(56) References Cited

U.S. PATENT DOCUMENTS

| | | | |
|---|---|---|---|
| 7,376,836 B2 | 5/2008 | Graves et al. ............... | 713/168 |
| 7,764,667 B1 | 7/2010 | Stewart et al. ............... | 370/352 |
| 7,954,145 B2 | 5/2011 | Mohanty et al. .............. | 726/15 |
| 8,082,434 B2 | 12/2011 | Hocking et al. ................ | 712/2 |
| 8,200,265 B2* | 6/2012 | Carlton .................. | H04W 4/02 |
| | | | 455/509 |
| 8,346,886 B2 | 1/2013 | Blandford | |
| 8,429,707 B2 | 4/2013 | Patel | |
| 8,539,025 B2 | 9/2013 | Husain et al. .............. | 709/203 |
| 8,539,039 B2 | 9/2013 | Sheu | |
| 8,635,672 B2 | 1/2014 | Yamada ........................ | 726/4 |
| 8,799,223 B1 | 8/2014 | Karmarkar | |
| 8,891,545 B2 | 11/2014 | Sartori | |
| 9,110,976 B2 | 8/2015 | Bolgert et al. | |
| 9,134,945 B2 | 9/2015 | Husain | |
| 9,197,697 B2 | 11/2015 | Morton | |
| 9,535,560 B1* | 1/2017 | Kominac ............... | G06F 3/048 |
| 9,697,629 B1 | 7/2017 | Vetter | |
| 2007/0180087 A1 | 8/2007 | Mizote | |
| 2008/0182667 A1 | 7/2008 | Davis .............................. | 463/43 |
| 2009/0063626 A1 | 3/2009 | Nakagawa et al. ........... | 709/203 |
| 2010/0010944 A1* | 1/2010 | Cheng ............... | G06F 17/30032 |
| | | | 706/12 |
| 2010/0060549 A1* | 3/2010 | Tsern .................. | G06F 3/1415 |
| | | | 345/2.1 |
| 2010/0241431 A1* | 9/2010 | Weng ...................... | G06F 3/038 |
| | | | 704/257 |
| 2010/0241699 A1 | 9/2010 | Muthukumarasamy et al. | |
| 2010/0257403 A1 | 10/2010 | Virk | |
| 2011/0093940 A1 | 4/2011 | Dal Canto et al. | |
| 2011/0153727 A1 | 6/2011 | Li ................................. | 709/203 |
| 2011/0306326 A1 | 12/2011 | Reed et al. | |
| 2011/0314153 A1* | 12/2011 | Bathiche ................. | H04L 63/08 |
| | | | 709/225 |
| 2011/0316790 A1* | 12/2011 | Ollila .................. | G06F 3/04883 |
| | | | 345/173 |
| 2012/0030632 A1* | 2/2012 | McRae .................... | G06F 3/017 |
| | | | 715/863 |
| 2012/0079126 A1* | 3/2012 | Evans ................... | G06F 9/4443 |
| | | | 709/230 |
| 2012/0096525 A1 | 4/2012 | Bolgert et al. ..................... | 726/6 |
| 2012/0134548 A1* | 5/2012 | Rhoads .................. | G06Q 30/06 |
| | | | 382/118 |
| 2012/0188147 A1 | 7/2012 | Hosein et al. | |
| 2012/0190299 A1* | 7/2012 | Takatsuka ................ | H04B 5/00 |
| | | | 455/41.1 |
| 2012/0235926 A1* | 9/2012 | Sip ....................... | G06F 3/04817 |
| | | | 345/173 |
| 2012/0254960 A1 | 10/2012 | Lortz et al. | |
| 2013/0054759 A1 | 2/2013 | Lim | |
| 2013/0067035 A1 | 3/2013 | Amanat | |
| 2013/0169546 A1 | 7/2013 | Thomas et al. ................ | 345/173 |
| 2013/0169571 A1* | 7/2013 | Gai ..................... | G06F 3/03547 |
| | | | 345/173 |
| 2013/0225080 A1* | 8/2013 | Doss ...................... | H04L 63/10 |
| | | | 455/41.2 |
| 2013/0239063 A1* | 9/2013 | Ubillos .................... | H04L 51/24 |
| | | | 715/838 |
| 2013/0305291 A1* | 11/2013 | Dua .................. | H04L 29/06027 |
| | | | 725/48 |
| 2013/0307771 A1* | 11/2013 | Parker ..................... | G06F 3/013 |
| | | | 345/158 |
| 2013/0314334 A1* | 11/2013 | Leica .................. | H04B 5/0031 |
| | | | 345/173 |
| 2014/0032774 A1* | 1/2014 | Lowekamp ............. | H04L 67/08 |
| | | | 709/230 |
| 2014/0046664 A1* | 2/2014 | Sarkar .................. | H04W 12/06 |
| | | | 704/246 |
| 2014/0096180 A1* | 4/2014 | Negi .................... | H04L 63/0492 |
| | | | 726/1 |
| 2014/0181855 A1* | 6/2014 | Fife .................. | H04N 21/25841 |
| | | | 725/25 |
| 2014/0196117 A1 | 7/2014 | Schwebke et al. | |
| 2014/0196137 A1 | 7/2014 | Schwebke et al. | |
| 2014/0223464 A1 | 8/2014 | Moran | |

OTHER PUBLICATIONS

International Search Report and Written Opinion; PCT/US2014/010363; pp. 8, dated Apr. 24, 2014.
International Preliminary Report with Written Opinion; PCT/US2014/010363; 5 pages, dated Jul. 16, 2015.
Extended European Search Report for European Patent Application No. 14735093.8, dated Sep. 5, 2016; 10 pages, dated Sep. 5, 2016.
Office Action received for European Patent Application No. 14735093.8, dated Jun. 9, 2017; 7 pages, dated Jun. 9, 2017.

* cited by examiner

INPUT REDIRECTION WITH A CLOUD CLIENT DEVICE

PRIORITY

This application claims the benefit, under 35 U.S.C. § 119(e), of U.S. Provisional Patent Application No. 61/749,781, filed 7 Jan. 2013, which is incorporated herein by reference.

TECHNICAL FIELD

This disclosure relates generally to portable information handling systems and, more particularly, to wireless-enabled, portable devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5 wherein like numbers are used to indicate like and corresponding parts.

Figure 1:
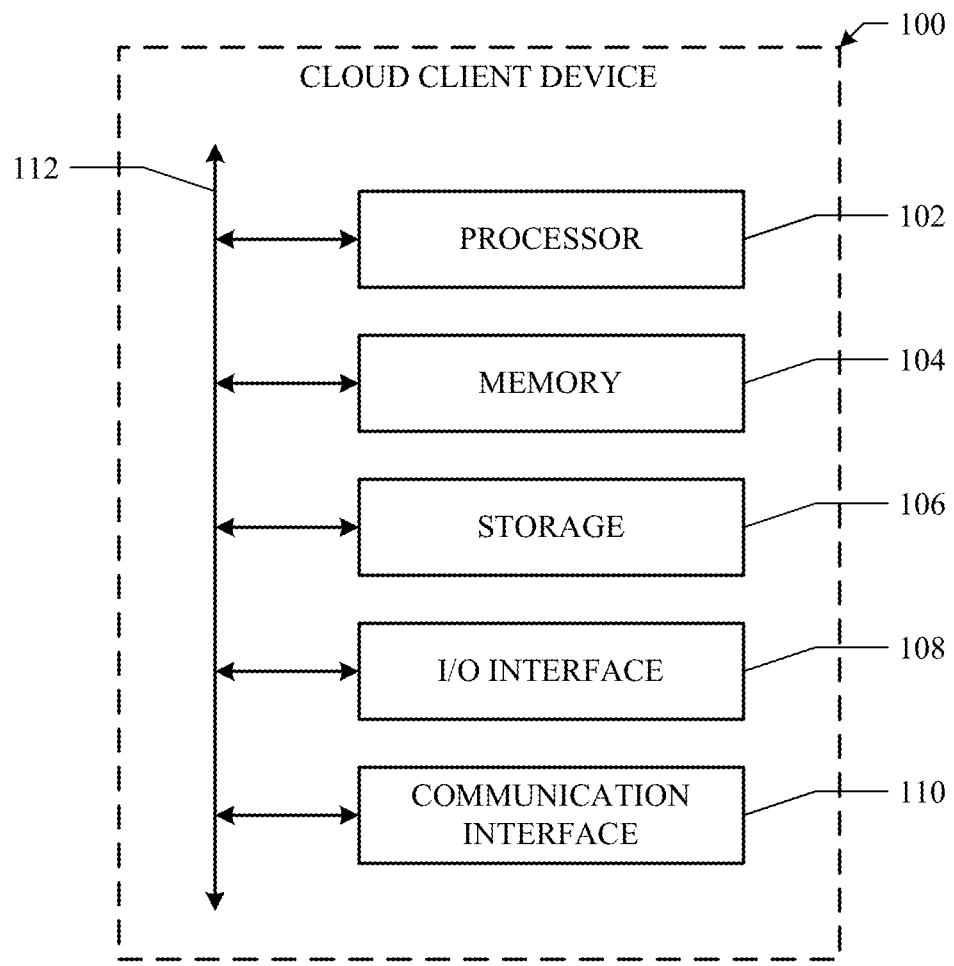
FIG. 1 is a block diagram of selected elements of an embodiment of a cloud client device.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 comprises a cloud client device (CCD). A CCD may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. The CCD may include networking or communication interfaces 110 that support IEEE 802.11 protocols (including a, b, g, or n), single or dual band WiFi, BLUETOOTH communication, and near field communication (NFC). The CCD may include one or more operating systems, including versions of Android, Windows, Wyse ThinOS, Linux, or Apple iOS. The CCD may include one or more native applications, including, for example, a browser, a media player and recorder, voice over IP and video communication software, and software for remote access to cloud services or other remote content or services. The CCD may plug directly into a device (e.g., a display device such as a television, monitor, or projector), may be connected via a cable (via one of the above-described interfaces) to a device, or may be connected via a wireless interface to a device (e.g., a display or client device). A user may, for example, use the CCD to securely communicate; access files or contents that are on the CCD, on another local device, or on a remote device (e.g., in a server of a cloud services organization); or control, interact with, or mediate one or more local devices (e.g., client devices) or remote devices (e.g., remote client devices). The CCD may be remotely provisioned, authenticated, and controlled including, for example, by a cloud service.

Figure 2:
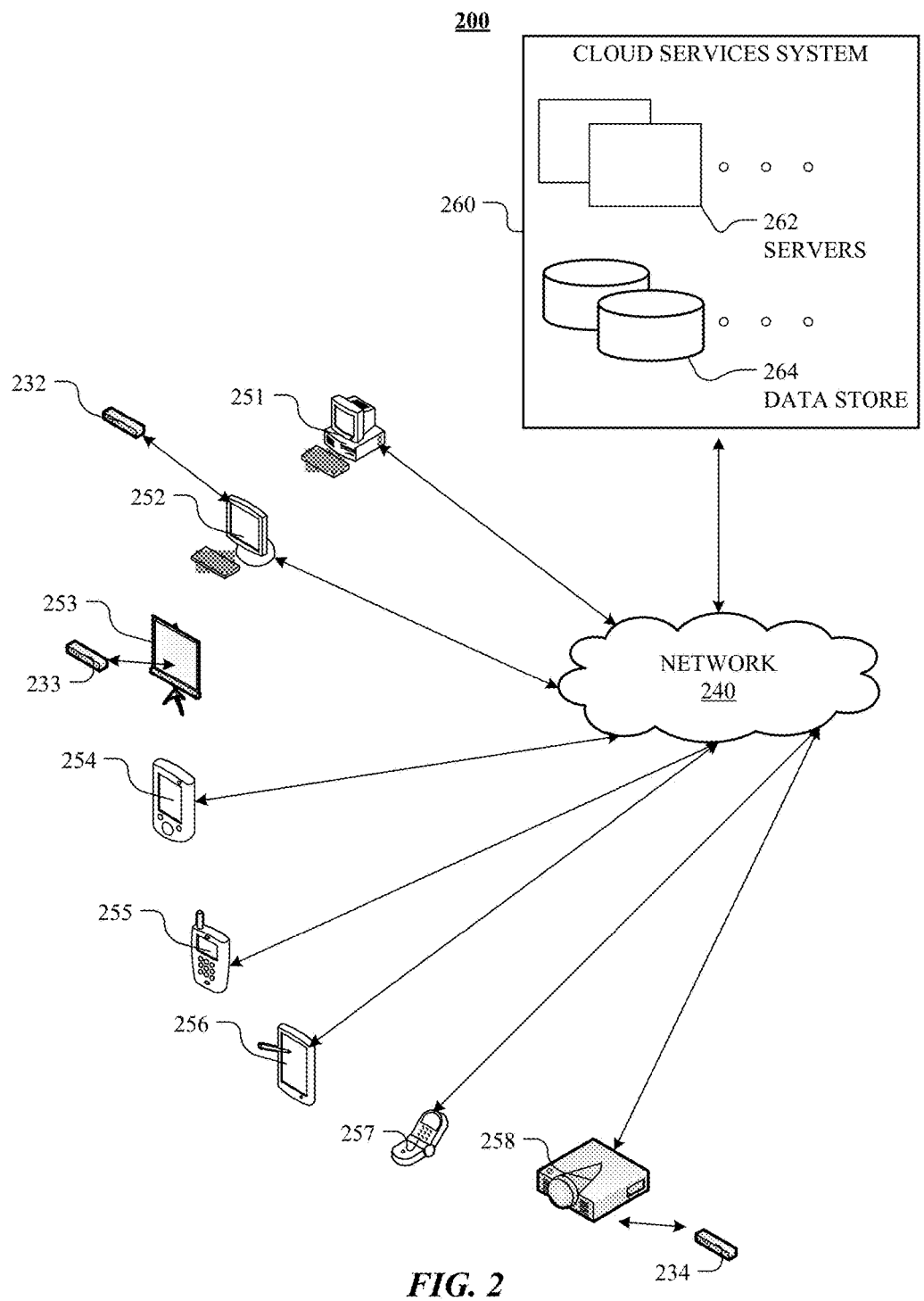
FIG. 2 is an example of a network environment in which a cloud client device may operate.

FIG. 2 illustrates an example network environment 200 in which a CCD may operate with other local or remote devices. In the example of FIG. 2, multiple devices and displays (e.g., elements 251, 252, and 254-258) are communicatively coupled (e.g., in any suitable wired or wireless fashion) to a network 240. Network 240 may be any suitable type of network including, for example, an ad hoc network, a personal area network (PAN), a local area network (LAN), a wide area network (WAN), a metropolitan area network (MAN), or one or more portions of the Internet or a combination of two or more of these network types. One or more portions of network 240 may be wired or wireless. As an example, network 240 may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, Network 240 may allow devices and displays coupled to it (e.g., elements 251, 252, and 254-258) to communicate with a cloud services system 260. Cloud services system 260 may, for example, include one or more servers 262 and a data store 264 including one or more data storage systems. Network 240 may also allow devices and displays coupled to it to communicate with each other. Although not illustrated in FIG. 2, one or more of the devices and displays of network environment 200 may, in particular embodiments, communicate with each other directly (e.g., wirelessly) or via any other suitable communication method.

In the example of FIG. 2, CCD 232 is coupled locally to computing device 252, CCD 233 is coupled locally to display 253, and CCD 234 is coupled locally to projector 258. As an example, CCD 232 may be wirelessly coupled to computing device 252 (e.g., via BLUETOOTH), CCD 233 may be coupled to display 253 via, for example, a USB port, and CCD 234 may be coupled to projector 258 via, for example, HDMI. Additionally, CCD 232, CCD 233, and CCD 234 may each communicate (or be coupled) with one another or with one or more devices or displays (e.g., elements 251-258) locally or directly (e.g., via NFC or BLUETOOTH), via their respective coupled devices (e.g., 252, 253, 258), via network 240, or via any other suitable communication method. Furthermore, CCD 232, CCD 233, and CCD 234 may each communicate with network 240 directly via any suitable communication method, without need of being coupled to a device (e.g., a display or a computing device).

In particular embodiments, the CCD is enabled to provide a wireless, remote interface for multi-platform control and mediation of one or more client or display devices (e.g., 251-258). The wireless, remote interface provided by the CCD may use any type of suitable wireless technology or standard including, but not limited to, IEEE 802.11 (a), (b), (g), and (n), WPS (Wi-Fi Protected Setup), BLUETOOTH, 3G and 4G mobile communication, and NFC. The platforms for each of the client or display devices (e.g., 251-258) may be the same or different and may include (by way of example and without limitation) Apple iOS, Microsoft Windows, Android, Wyse ThinOS, or Linux. Furthermore, each of the client or display devices (e.g., 251-258) may include a software application configured to interact with the CCD (e.g., 232, 233, or 234) or with other client or display devices.

The CCD may function with a client device (e.g., a keyboard, mouse, tablet, computer, or phone) and enable remote events at the client device to interact with or control the CCD, a remote client device, or a display device (e.g., a television, projector, or monitor). As an example, a wireless keyboard or mouse may be used with the CCD, with a remote display device displaying the input from the keyboard or mouse. As another example, CCD 233 may be coupled to display 253, and remote touch events from tablet 256 may control what is displayed on display 253. As another example, CCD 232 may be coupled to computer 252, and input (e.g., data or I/O from peripherals) may be directed by CCD 232 from computer 252 to display 253, tablet 256, and projector 258 simultaneously. In particular embodiments, inputs from a single client device (e.g., phone 254) may be communicated to the CCD (e.g., 232, 233, or 234), such that the user of the client device maintains control over the CCD (and a display device coupled to the CCD, e.g., monitor of computer 252, display 253, or projector 258), with the effect that the client device acts as a flexible wireless input device for the CCD. As an example, in a classroom setting, content displayed on an instructor's tablet client device (e.g., 256) may be shared with students via the CCD (e.g., 233) by having the display device (e.g., 253) simultaneously display or mirror the display of the instructor's tablet client device. The instructor may control the CCD via the tablet and manipulate the content shown on the display by using gestures (e.g., touch or multi-touch), soft keyboards, or touchpad functionality on the tablet.

In other embodiments, multiple client devices (e.g., keyboards, mice, etc.) may be used with one CCD, with the inputs from one or more of these devices simultaneously being processed by the CCD and in some circumstances displayed on one or more display devices. As an example, again in a classroom setting, an instructor may use a tablet client device, a first student may use a smartphone soft-keyboard, and a second student may use a BLUETOOTH keyboard, and the inputs from all of these devices may be received by a CCD and displayed on a display device such as a monitor. As yet another example, multiple people using multiple client devices (e.g., tablets or smartphones) may together play a single game (e.g., streamed from the Internet via the CCD) displayed on a single display device, with the inputs from each of the devices going to the CCD.

In particular embodiments, the CCD may be enabled to function with one or more multifunction display devices, such as multi-touch-enabled displays and/or displays with integrated webcams, speakers, microphones, etc. As an example, if the CCD is paired with a touch monitor (e.g., via a wired or direct plug-in connection to the monitor such as USB/MHL/HDMI, or via BLUETOOTH, NFC, or any other wireless technology), the CCD may be configured to operate directly with the display device, allowing a user to input touch gestures directly on the display device and interact with data displayed on the display device by the CCD. For example, if the user is navigating a website using a browser via the CCD, and the CCD is paired with a touch display device, the user may directly touch the display device to interact with the website, and the CCD will recognize and properly process the touch inputs. In other embodiments, the user may operate both a touch display device and one or more separate client devices (e.g., mouse, keyboard, tablet, or smartphone) simultaneously, such that the user may input data via any or all of the client devices or display devices.

In particular embodiments, the CCD may be enabled to function in a unified communications framework. As an example, the CCD may be enabled to function with services such as instant messaging (e.g., including presence information), telephony (e.g., IP telephony), video conferencing, data sharing (including Interactive White Boards), IPTV, call control (e.g., for VoIP), speech recognition, and unified messaging. In particular embodiments, the CCD may be enabled to function with (e.g., send data to and receive data from) one or more display devices that include cameras. As an example, if the CCD is paired with a television including a camera (e.g., a built-in camera or webcam), microphone (e.g., built-in or attached as a USB peripheral), and an audio out (e.g., built-in speakers or speakers attached as peripherals), the CCD may be configured to operate directly to allow a user to engage in videoconference calls. The configuration may, for example, occur in conjunction with a cloud services provider (e.g., cloud services system 260), described further herein. As an example, the cloud services provider may allow the CCD to set up a SKYPE session, and link the user of display 253 to another user via the videoconference. The CCD may operate with various types of display devices with various types of functionality including, but not limited to, multi-touch gestures, GPS or other location data, audio functionalities (including microphones and speakers), or camera input. In some embodiments, the CCD is enabled to communicate with such additional components of the multi-function display device via the same interface over which it sends display information (e.g., MHL via an HDMI interface). In other embodiments, the CCD is enabled to communicate with such components via an interface distinct from the display interface (e.g., the CCD may send display information to the display device via an HDMI connection and may receive multi-touch input information from the display device via a separate USB connection).

In particular embodiments, the CCD is enabled to provide a wireless, remote interface including gesture redirection (e.g., touch or multi-touch gestures) or input/output redirection (e.g., of any suitable type including those listed herein) in conjunction with one or more devices. The CCD, for example, may provide a virtualized touch interface. The CCD may function with a client device (e.g., a smartphone, tablet, laptop, etc.) to redirect multi-touch gestures from the client device to control or otherwise interact with a display device or another client device. For example, a user of a smartphone may swipe, fling, use multiple-finger touch inputs (including, e.g., from a soft-keyboard), pinch-to-zoom, scroll, etc. on the smartphone. These multi-touch gestures may be received by the CCD (e.g., by a multi-touch client receiver) and used to control or interact with one or more display devices or client devices (e.g., via a multi-touch gesture proxy controller and a native display driver of the display device). As an example, input from one client device (e.g., a user's pinching multi-touch gesture at tablet 256) may be sent to a CCD (e.g., 232), which then exports the input to control the operation of another client device (e.g., to cause a zoom in on an image displayed in a browser running on computer 252). In this example, the output displayed on computer 252 may then be sent to the CCD 232 and displayed on tablet 256. As described above, multiple client devices may be used with one CCD in certain embodiments, with the multi-touch inputs from one or more of these devices being simultaneously displayed or used to control on one or more display or client devices.

The types of input gathered from client devices (e.g., 251-258) may be any type of input including, but not limited to, gestures (e.g., touch or multi-touch gestures, described herein), keyboard input, mouse input, accelerometer input, gyroscope input, GPS or other location data, camera input (video or still images), sound input (e.g., from a microphone), or input from any suitable type of sensor including, e.g., acoustic, sound, vibration, chemical, electric, magnetic, radio, environmental, navigation, optical, pressure, temperature, or proximity sensors. Any suitable input from a client device may be sent to a CCD, which may then send this input to any other client device (including any peripheral or other component of the client device), display device, remote device, etc. As an example, a user's voice input at phone 255 may be sent to a CCD (e.g., 233) which then sends that voice data to be played on a speaker at computer 251.

In particular embodiments, a CCD may be configured to translate inputs between devices. In this manner, resources, features, and functionality of one device may be made available to another device via mediation by the CCD using, for example, a transparent wireless transport protocol (e.g., WiFi or BLUETOOTH). For example, inputs received at a first device, such as a smartphone, may be intercepted, communicated to the CCD, translated into a format understood by a second device or application, and provided to that second device or application. As an example, a gesture or an input may be translated to multi-touch at a device, and vice versa. As another example, voice input from a first device (e.g., at a microphone) may be translated to text at a second device, and vice versa. As yet another example, a gesture at a first device (e.g., captured by a camera) may be translated to an action (e.g., scrolling) at a second device. In some cases, the device or application receiving the remote inputs may be able to receive and process those inputs in their original format. In such cases, the inputs need not necessarily be translated, but may be redirected by the CCD.

In particular embodiments, a CCD may be configured to provide virtual sensors (or other functionality) to a client device or display (e.g., in a manner similar to a virtual USB hub). As an example, if CCD 233 is coupled (e.g., plugged into a USB port) with display 253, then CCD 233 may dynamically construct a virtual set of sensors and other devices (e.g., 251, 252, and 254-258) for use by display 253. That is, CCD 233 may determine what other devices (and what sensors on those devices) are available for pairing by, for example, conducting a scan to see if the local network contains pairable devices (e.g., devices within a communication range for pairing). For those pairable devices, the CCD 233 may request the devices to enter a pairing mode and then scan (e.g., NFC tags, or other pairing methods) to construct a model of available devices or sensors (e.g., a mesh). The CCD 233 may then pair those with display 253 and provide functionality or services from those devices or sensors to display 253. As an example, CCD 233 may couple a phone (e.g., 254) with display 253, such that if a user at display 253 using CCD 233 needs her location information (e.g., to authenticate an account with cloud services system 260), the GPS module of phone 254 may be seamlessly used to provide location information and authenticate CCD 233. In this manner, a user need not manually couple or otherwise pair local devices, download drivers manually, or do other manual configurations of CCD 233 or display 253.

In particular embodiments, the CCD may be enabled to operate in conjunction with cloud (or other remote or virtualized) services. As examples, the CCD may include software that enables it to function with the Dell Wyse Cloud Client Manager or Dell Wyse PocketCloud software, or any other suitable remote or cloud service.

As an example, the CCD may be enabled to operate with a cloud service (e.g., 260) such as the Dell Wyse Cloud Client Manager (Dell CCM). Through the cloud service, the CCD may be remotely provisioned and authenticated. The cloud service may provide, for example and without limitation, access to data, applications, services, or remote desktops.

In particular embodiments, the CCD may be authenticated using a variety of methods including WiFi Protected Setup (e.g., by using a WPS certified router to establish connectivity to the cloud service), an SD Card or USB source (or any other local source) of a configuration file, or a client device. As an example, a token stored on a particular client device may be required to authenticate a user attempting to access a CCD. When the client device (e.g., a smartphone, tablet, laptop, etc.) supporting BLUETOOTH, NFC, or other wireless technology is brought into proximity with the CCD, the CCD may obtain a secure or encrypted token (e.g., an RSA token) from the client device over the wireless interface. Once this secure token is obtained, the CCD may then authenticate its credentials with the cloud service.

The CCD may, for example, send particular data to the cloud service for authentication. The data may include, for example, the security token, location of the CCD (determined, e.g., based on data from a GPS transmitter of the CCD or MAC address scanning), an IP address of the CCD, a MAC address of the CCD, a usage log of usage behavior or statistics associated with the CCD, software or hardware versions of components of the CCD, etc. Based on the data received from the CCD, the cloud service may construct a profile associated with the CCD (e.g., stored in data store 264) or, alternatively, find and analyze (e.g., via servers 262) an existing profile associated with the CCD. For example, the CCD may be associated with a particular user of the cloud service, and particular security, authentication, quality-of-service, access, encryption, or other settings or data may be associated with the user in the user profile for the cloud service. The profile associated with a CCD in the cloud service may be specific to a user associated with the CCD, an entity associated with the CCD (e.g., a corporate profile with corporate settings), or any other individual, group of individuals, or organization associated with the CCD. Furthermore, if the CCD is not associated with a profile in the cloud service, the cloud service may use certain default settings to authenticate or provision the CCD.

In particular embodiments, when the cloud service receives data from the CCD, the cloud service may determine which user the CCD is associated with (e.g., based on a MAC address of the CCD), examine the profile for this user, and authenticate and provision the CCD based on data in this profile. As an example, the cloud service may determine that the CCD is associated with a user whose profile only allows cloud service access within a particular geographical region. If, for example, the CCD is presently in South America (as determined, for example, from the CCD's IP address or by approximating the location of the CCD by analyzing the wireless networks within the range of the CCD), but the profile for the user associated with the CCD allows CCD access to the cloud service and data only within North America, then the cloud service may refuse to authenticate the CCD. Any appropriate security measure may be enforced by the cloud service based on data associated with the CCD or the cloud service user profile. As another example, the user profile may include white- or black-lists that detail websites, cloud services or applications that the user may be able to access (or may be denied access to) depending on the location of the CCD or depending on other information associated with the CCD (e.g., processes currently running on the CCD).

In addition to allowing or denying access to cloud services or applications, the CCD may be remotely wiped (e.g., to a reset or clear state for re-imaging), locked, or queried (e.g., a query to determine the location of the CCD) by the cloud service, including, e.g., by a cloud service administrator. In particular embodiments, the CCD may be remotely wiped if another client device (e.g., a smartphone) is not within a particular range of the CCD. In particular embodiments, a specific standard method for wiping by overwriting the file system of the CCD may be employed such that the CCD may not be recoverable by a third party. This may be administered by the cloud service, or may be independently deployed. The CCD may be completely wiped (e.g., to factory settings) if certain conditions are met (e.g., if the cloud service determines the CCD should be wiped). In other embodiments, the CCD may be wiped in a manner that leaves all cloud-services-installed applications on the CCD but removes everything else. In particular embodiments, certain zones of the memory or storage of the CCD may be wiped, and in other embodiments, the entire CCD may be wiped.

The CCD may be fully imaged and the operating system of the CCD may be fully recovered via the cloud service even if the CCD is wiped or reset at an earlier time (e.g., by the cloud service for security reasons). The CCD may have any type of profile settings, content, or connections automatically pushed to it from the cloud service. The CCD may receive system updates from the cloud service including, for example, firmware or application updates. These updates may be determined based on information in the cloud service profile associated with the CCD, as well as information received from the CCD. The cloud service may also manage files on the CCD, as well as partition the CCD (e.g., into personal and corporate segments with separate profiles). The data transferred between the CCD and the cloud service may, for example, be encrypted using standard encryption, proprietary encryption, or a combination of both types. The cloud service may implement various policies or rules on the CCD after authenticating and provisioning the CCD. For example, the cloud service profile associated with a CCD may include policies related to quality-of-service, such that the cloud service may track data usage of the CCD and may implement quality-of-service data usage policies on the CCD. In addition to using the cloud service, the recovery of data on the CCD or the upgrading or updating of software on the CCD may be accomplished in the following ways:

1) Manually via the CCD itself (e.g., using a wireless interface in the CCD to automatically retrieve data, e.g., from a cloud service or from the Internet)
2) Connecting the CCD to a PC (e.g., obtaining data stored on the PC or using a web-based application on the PC to repair or update the CCD without needing to download any data to the PC)
3) Using data stored on a MicroSD (or other type of storage) card operable with the CCD, or
4) Using a purely web-based remote update mechanism to remotely send data to the CCD.

The CCD may be operable to access other types of remote networks or services, as well as cloud services. For example, the CCD may be fully pre-configured to access a virtual private network (VPN), for example by the owner of virtual private network (e.g., a corporation whose employees are issued pre-configured CCDs). Thus, in particular embodiments, the CCD may have automatic VPN provisioning without any need for user input or configuration. The automatic VPN provisioning may occur, in particular embodiments, through the authentication or provisioning process by a cloud service, described above, and may, for example, provision based on a user's profile. Additionally, in combination with other capabilities of the CCD described herein, a user at one location on the VPN network may connect to services from a device at another location on the VPN network (e.g., a printer in a private office network), allowing for any device to remote its functions over both local networks and VPNs, as well.

In particular embodiments, the CCD may be enabled to operate with multiple types of security protocols. As an example, the authentication of the CCD by receipt of a security token from a client device via BLUETOOTH or NFC (as described earlier in detail) may be a first level of security. A second level may be imposed through a cloud service authentication of the CCD (e.g., through the cloud service analysis of data provided by the CCD and through profile data associated with the CCD). Additionally, the links between the CCD and the cloud service (or any other links) may be encrypted using any suitable standard or proprietary encryption techniques. Finally, at any of these steps, a PIN or log-in may be required for a particular user using the CCD, as it is contemplated that multiple users may be associated with a single CCD, or that a single user may have separate profiles (e.g., work and personal) for a single CCD.

These security measures may enable the CCD to act as a portable and secure computing device even when highly confidential material is involved. Even if an unauthorized person obtains a CCD, obtains the client device with the secure token required for authentication of the CCD, and obtains all necessary log-in information to operate the CCD, the owner of the CCD may remotely disable and/or wipe the memory of the CCD via a cloud service (e.g., via Dell CCM). Moreover, as mentioned above, the CCD may be configured to automatically set up appropriate connections and communications sessions upon initialization and authentication, including automatic configuration of a VPN via a cloud service. A CCD may thus be configured to automatically present the user with a remote desktop (in conjunction with well-known virtualization and/or cloud computing software, such as that provided by Citrix and VMWare) that is similar to or identical to the desktop environment on the user's networked office computer. The CCD thus presents the possibility of low-cost, highly portable, highly secure, and broadly compatible computing.

The CCD may be enabled to operate with client-to-client software such as Dell Wyse PocketCloud software. The client-to-client software may, in particular embodiments, be used in conjunction with one or more cloud or remote services (e.g., the Dell Wyse Cloud Client Manager described above).

In particular embodiments, the CCD may be enabled to operate with client-to-client software that enables the CCD to see, communicate with, and otherwise interact with (or control) other client devices and their contents. As an example, multi-touch redirection, described above, may be implemented using the client-to-client software on the CCD and other devices. As an example, the CCD may include an application that allows the CCD to discover and access content across multiple client devices. Each of the devices may, for example, run an instance of the application, and each device may recognize and access other devices over BLUETOOTH, IEEE 802.11, ad-hoc wireless networking, IP networks, 3G or 4G connectivity, etc. The connection between these devices may, in particular embodiments, need not ever go to a cloud service, the Internet, or any other remote network and may, for example, be done entirely in a peer-to-peer fashion. In other embodiments, the connection between these devices may occur in part over a remote network. The client-to-client software may, for example, include a browser (e.g., Chrome) that allows the CCD and other devices to share a single content display (e.g., a single streaming video) as well as to share the control of content on one or more displays (e.g., a multi-player video game in which input is received from multiple client devices). The client-to-client software may allow the CCD and other devices to search and share applications or files (including video, audio, etc.); stream files; or copy, move, and backup files among each other. The client-to-client software may also allow the CCD and other devices to create a shared drive that is either public or private. The client-to-client software may, for example, also include auto-discovery, network management, file management (e.g., download, upload, copy, move, delete, rename, stream, or preview, etc.), and file transcoding (e.g., pause, play, fast forward, rewind, etc.) capabilities. The CCD may act as a router or central point through which any or all of the client-to-client activities or traffic may pass. In particular embodiments, the client-to-client software may also include an application (e.g., Dell Wyse Freezer, or any other HTML5 client) that allow the client devices to access proprietary applications (e.g., a remote Windows desktop, applications, or files) via a web application browser.

The CCD may be a low-power device. The CCD may receive power in accordance with the MHL 1.0 standard, or in accordance with subsequent revisions of the MHL standard. This allows the use of a single physical interface that may both provide power to the CCD and serve as the communications interface between the display device and the CCD. In other embodiments, the CCD may be powered via a separate interface, such as a USB port (e.g., connected to the display device or to another USB-enabled device), or via an A/C adapter. A CCD may also be configured to be broadly compatible and to receive power via any of these interfaces, depending on which is available.

Figure 3:
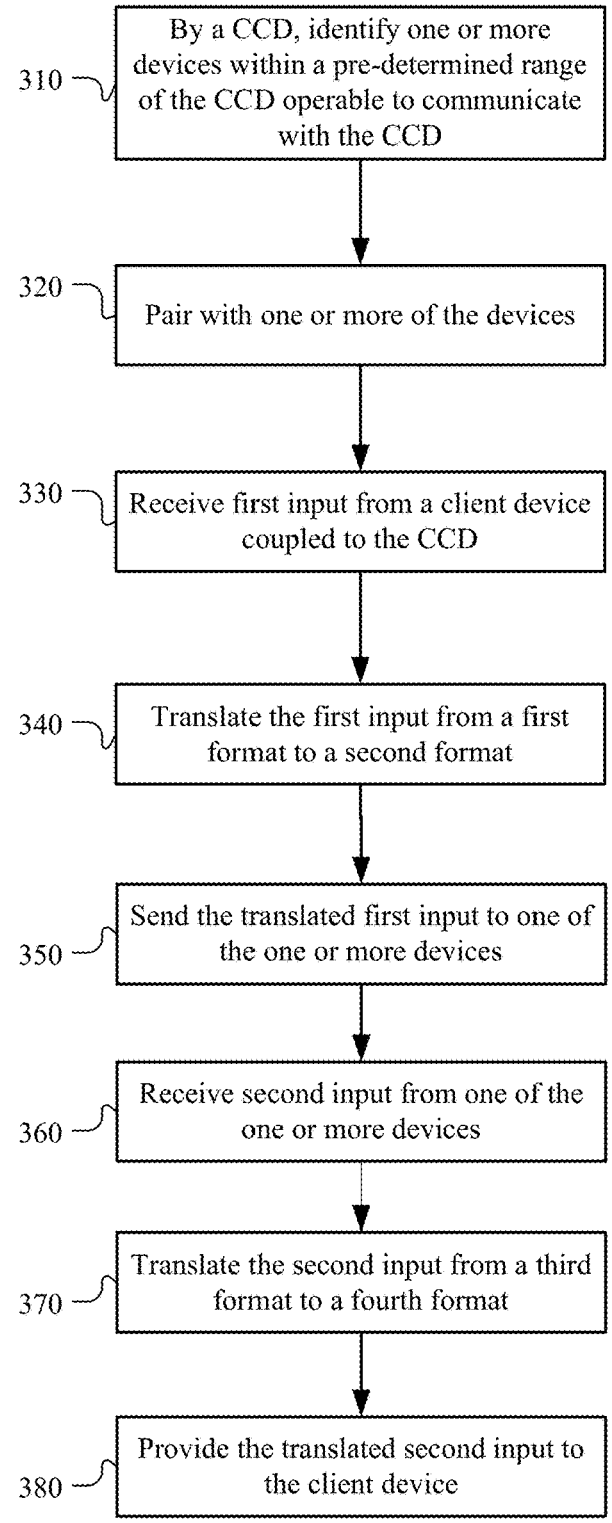
FIG. 3 is flowchart depicting an example method for input redirection with a cloud client device.

FIG. 3 illustrates an example method 300 for input redirection with a CCD. The method may begin at step 310, where a CCD identifies one or more devices within a pre-determined range of the CCD operable to communicate with the CCD. At step 320, the CCD pairs with one or more of the devices. At step 330, the CCD receives first input from a client device coupled to the CCD. At step 340, the CCD translates the first input from a first format to a second format. At step 350, the CCD sends the translated first input to one of the one or more devices. At step 360, the CCD receives second input from one of the one or more devices. At step 370, the CCD translates the second input from a third format to a fourth format. At step 380, the CCD provides the translated second input to the client device. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for input redirection with a CCD including the particular steps of the method of FIG. 3, this disclosure contemplates any suitable method for input redirection with a CCD including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
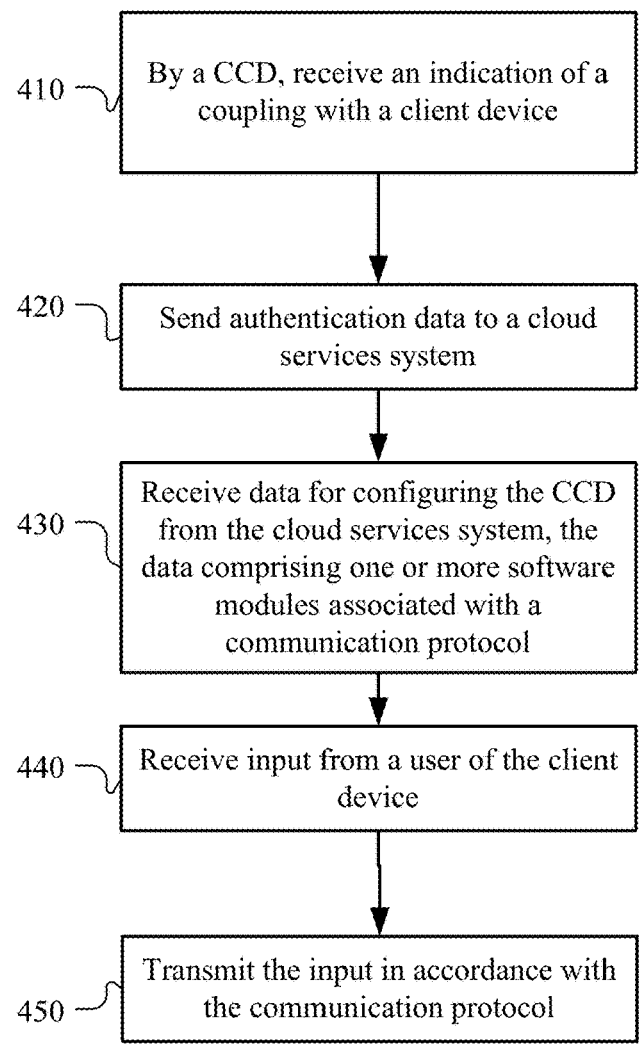
FIG. 4 is flowchart depicting an example method for unified communications with a cloud client device.

FIG. 4 illustrates an example method 400 for unified communications with a CCD. The method may begin at step 410, where a CCD receives an indication of a coupling with a client device. At step 420, the CCD sends authentication data to a cloud services system. At step 430, the CCD receives data for configuring the CCD from the cloud services system, the data comprising one or more software modules associated with a communication protocol. At step 440, the CCD receives input from a user of the client device. At step 450, the CCD transmits the input in accordance with the communication protocol. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for unified communications with a CCD including the particular steps of the method of FIG. 4, this disclosure contemplates any suitable method for unified communications with a CCD including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
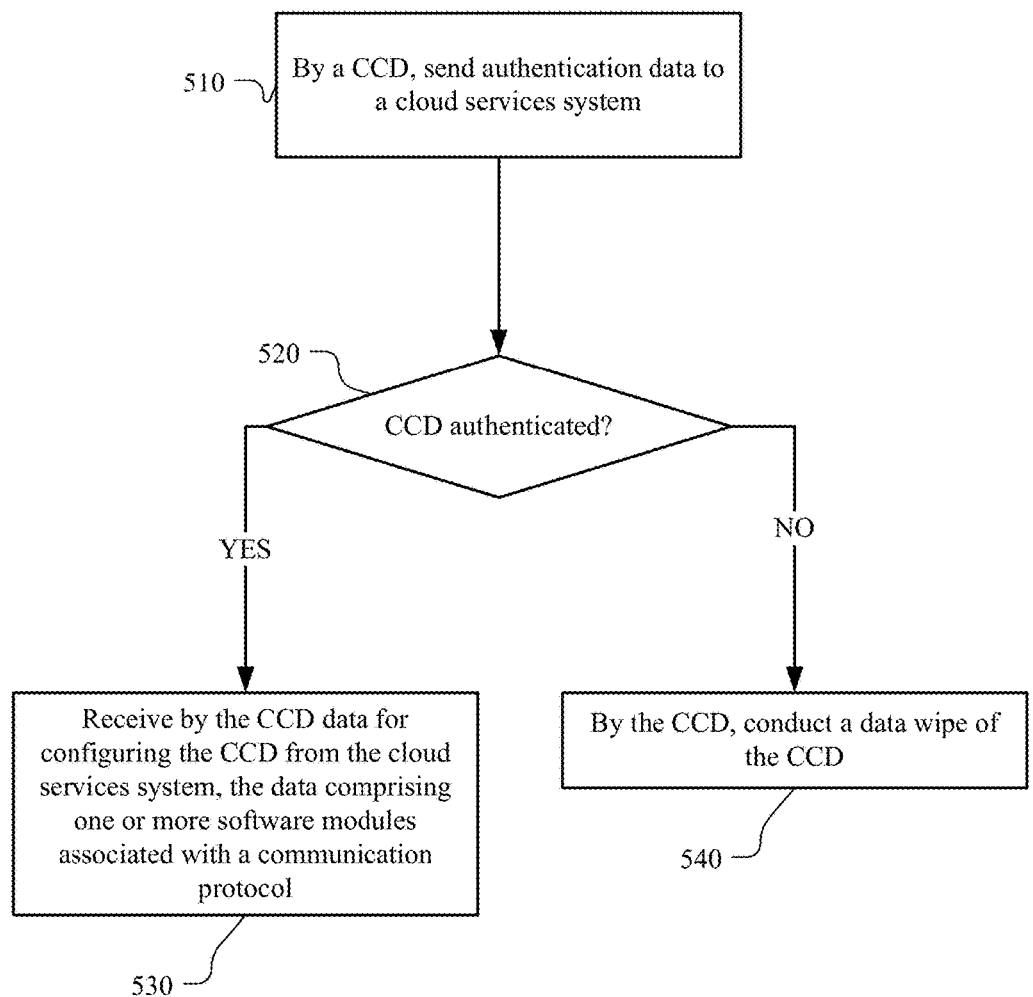
FIG. 5 is a flowchart depicting an example method for recovery or upgrade of a cloud client device.

FIG. 5 illustrates an example method 500 for recovery or upgrade of a CCD. The method may begin at step 510, where A CCD sends authentication data to a cloud services system. At step 520, the cloud services system determines if the CCD is authenticated. If the CCD is authenticated, at step 530, the CCD receives data for configuring the CCD from the cloud services system, the data comprising one or more software modules associated with a communication protocol. If, however, the cloud services system determines the CCD is not authenticated, at step 540, the CCD conducts a data wipe of the CCD. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for recovery or upgrade of a CCD including the particular steps of the method of FIG. 5, this disclosure contemplates any suitable method for recovery or upgrade of a CCD including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a cloud client device, identifying one or more devices and one or more sensors on the one or more devices are within a pre-determined communication range of the cloud client device operable to communicate with the cloud client device;
   by the cloud client device, determining the one or more devices available for pairing;
   by the cloud client device, providing a wireless, remote interface to the one or more devices;
   by the cloud client device, authenticating the one or more devices available for pairing, wherein authenticating comprises obtaining at least a security token from the one or more devices available for pairing and sending the security token to a cloud service for authentication, wherein a profile is associated with the cloud client device, wherein the profile is specific to a particular user of the cloud service, wherein the cloud client device is restricted to one or more services from the cloud service based on the profile;
   by the cloud client device, receiving configuration data from the cloud service;
   by the cloud client device, configuring the cloud client device using the configuration data, wherein the configuration data comprises data associated with a communication protocol;
   by the cloud client device, requesting the one or more devices available for pairing to enter a pairing mode;
   by the cloud client device, pairing a display coupled to the cloud client device with the one or more devices available for pairing;
   by the cloud client device, providing a service of the paired one or more devices available for pairing to the display;
   by the cloud client device, receiving a first input from a client device coupled to the cloud client device;
   by the cloud client device, translating the first input from a first format to a second format;
   by the cloud client device, sending the translated first input to one of the one or more devices available for pairing using the communication protocol;
   by the cloud client device, receiving second input from one of the one or more devices available for pairing;
   by the cloud client device, translating the second input from a third format to a fourth format; and
   by the cloud client device, displaying the translated second input on the display.

2. The method of claim 1, wherein the client device is a display comprising one or more of the following:
   a television;
   a monitor; or
   a projector.

3. The method of claim 1, wherein the client device is coupled to the cloud client device via one or more interfaces operable with one or more of the following:
   NFC;
   BLUETOOTH;
   IEEE 802.11;
   MHL;
   HDMI;
   DP; or
   USB.

4. The method of claim 1, wherein identifying one or more devices within a pre-determined range of the cloud client device operable to communicate with the cloud client device comprises conducting a scan of a local network in which the cloud client device operates.

5. The method of claim 1, wherein pairing with one or more of the devices available for pairing comprises:
   requesting the identified devices to enter a pairing mode;
   scanning the identified devices;
   determining which of the identified devices are available for the pairing mode; and
   pairing with the available devices.

6. The method of claim 1, wherein the first input comprises multi-touch input from a user of the client device coupled to the cloud client device.

7. The method of claim 1, wherein the first input comprises gesture input from a user of the client device coupled to the cloud client device.

8. The method of claim 1, wherein the first input comprises data from one or more sensors of the client device.

9. The method of claim 1, wherein the first format and the second format are the same.

10. The method of claim 1, wherein the third format and the fourth format are the same.

11. A cloud client device comprising a non-transitory storage medium storing one or more instructions, that, when executed by a processor of the cloud client device, cause the processor to:
   identify one or more devices and one or more sensors on the one or more devices are within a pre-determined communication range of the cloud client device operable to communicate with the cloud client device;
   determine the one or more devices available for pairing;
   provide a wireless, remote interface to the one or more devices;
   authenticate the one or more devices available for pairing, wherein the authentication comprises obtaining at least a security token from the one or more devices available for pairing and sending the security token to a cloud service for authentication;
   receive configuration data from the cloud service;
   configure the cloud client device using the configuration data, wherein the configuration data comprises data associated with a communication protocol, wherein a profile is associated with the cloud client device, wherein the profile is specific to a particular user of the cloud service, wherein the cloud client device is restricted to one or more services from the cloud service based on the profile;
   request the one or more devices available for pairing to enter a pairing mode;
   pair a display coupled to the cloud client device with the one or more of the devices available for pairing;
   provide a service of the paired one or more devices available for pairing to the display;
   receive a first input from a client device coupled to the cloud client device;
   translate the first input from a first format to a second format;
   send the translated first input to one of the one or more devices available for pairing;
   receive second input from one of the one or more devices available for pairing using the communications protocol;
   translate the second input from a third format to a fourth format;
   provide the translated second input to the client device; and
   display the translated second input on the display.

12. The cloud client device of claim 11, wherein the client device is a display comprising one or more of the following:
   a television;
   a monitor; or
   a projector.

13. The cloud client device of claim 11, wherein the client device is coupled to the cloud client device via one or more interfaces operable with one or more of the following:
   NFC;
   BLUETOOTH;
   IEEE 802.11;
   MHL;
   HDMI;
   DP; or
   USB.

14. The cloud client device of claim 11, wherein identifying one or more devices within a pre-determined range of the cloud client device operable to communicate with the cloud client device comprises conducting a scan of a local network in which the cloud client device operates.

15. The cloud client device of claim 11, wherein pairing with one or more of the devices available for pairing comprises:
   requesting the identified devices to enter a pairing mode;
   scanning the identified devices;
   determining which of the identified devices are available for the pairing mode; and
   pairing with the available devices.

16. The cloud client device of claim 11, wherein the first input comprises multi-touch input from a user of the client device coupled to the cloud client device.

17. The cloud client device of claim 11, wherein the first input comprises gesture input from a user of the client device coupled to the cloud client device.

18. The cloud client device of claim 11, wherein the first input comprises data from one or more sensors of the client device.

19. The cloud client device of claim 11, wherein the first format and the second format are the same.

20. The cloud client device of claim 11, wherein the third format and the fourth format are the same.

* * * * *